United States Patent [19]
Hergenrother et al.

[11] Patent Number: 5,552,483
[45] Date of Patent: Sep. 3, 1996

[54] BLOCK COPOLYMERS OF POLYSILOXANES AND COPOLYMERS OF CONJUGATED DIENES AND AROMATIC VINYL COMPOUNDS, AND MULTILAYER STRUCTURES CONTAINING SAME

[75] Inventors: William L. Hergenrother, Akron; Daniel F. Graves, Clinton, both of Ohio

[73] Assignee: Bridgestone Corporation, Tokyo, Japan

[21] Appl. No.: 438,495

[22] Filed: May 10, 1995

Related U.S. Application Data

[62] Division of Ser. No. 146,696, Nov. 1, 1993, which is a division of Ser. No. 722,743, Jun. 28, 1991, Pat. No. 5,260,123.

[51] Int. Cl.$^6$ .................................................... C04L 53/00
[52] U.S. Cl. ................................................ 525/90; 575/926
[58] Field of Search ............................ 525/90, 926, 105, 525/100, 106, 479

[56] References Cited

U.S. PATENT DOCUMENTS

| | | |
|---|---|---|
| 3,051,684 | 8/1962 | Morton . |
| 3,483,270 | 12/1969 | Bustich . |
| 3,576,904 | 4/1971 | Scam et al. ................................. 525/90 |
| 3,640,943 | 2/1972 | Bostick et al. ............................. 525/90 |
| 3,673,272 | 6/1972 | Dean . |
| 3,686,356 | 8/1972 | Scam .......................................... 525/90 |
| 3,691,257 | 9/1972 | Kendrick et al. ........................... 525/90 |
| 3,760,030 | 9/1973 | Dean . |
| 3,875,254 | 4/1975 | Dean . |
| 3,928,490 | 12/1975 | Hergenrother ............................ 525/479 |
| 4,359,340 | 11/1982 | Compu et al. . |
| 4,381,331 | 4/1983 | Johnson . |
| 4,500,466 | 2/1985 | Hayes et al. . |
| 4,533,305 | 8/1985 | Comper et al. . |
| 4,547,544 | 10/1985 | Allandice . |
| 4,677,169 | 6/1987 | Crivello et al. . |
| 4,713,409 | 12/1987 | Huges et al. . |
| 4,720,526 | 1/1988 | Rolise . |
| 4,853,069 | 9/1989 | Williams et al. . |
| 4,954,408 | 9/1990 | George . |
| 5,086,141 | 2/1992 | George . |
| 5,089,336 | 2/1992 | Kumar et al. . |
| 5,281,666 | 1/1994 | Hoxmeier ................................. 525/105 |
| 5,296,574 | 3/1994 | Hoxmeier ................................. 528/25 |

OTHER PUBLICATIONS

European Search Report for Appl. No. 92110052.5, mailed Jun. 7, 1993.

Kesten et al, "Thermoplastic Elastomers Based On Polysiloxanes", *Institute of Polymer Science*, University of Akron, John Wiley & Sons, (1975) pp. 113–121.

*Primary Examiner*—Ralph H. Dean
*Attorney, Agent, or Firm*—Daniel N. Hall

[57] ABSTRACT

Block copolymers are described which comprise alternating blocks of (A) a polysiloxane; and (B) a copolymer of a 1,3-conjugated diene and a monovinyl aromatic compound. The block copolymers can be prepared by reacting a polysiloxane with a dilithiated copolymer of a conjugated diene and a monovinyl aromatic compound and thereafter neutralizing the reaction product with a protonic acid or a polyfunctional alkyl silane or silicon tetrachloride. Cured elastomer compositions exhibiting surface release characteristics are obtained by curing a mixture comprising the above-described block copolymer in the presence of a curing system comprising a peroxide and sulfur. Multilayer elastomer structures useful in manufacturing articles from elastomeric materials also are described wherein at least a portion of an outer layer of the multilayer elastomer structure has release characteristics and comprises the cured block copolymers of the present invention.

15 Claims, 1 Drawing Sheet

5,552,483

BLOCK COPOLYMERS OF POLYSILOXANES AND COPOLYMERS OF CONJUGATED DIENES AND AROMATIC VINYL COMPOUNDS, AND MULTILAYER STRUCTURES CONTAINING SAME

This is a division of application Ser. No. 08/146,696, filed Nov. 1, 1993, which is a division of Ser. No. 07/722,743, filed Jun. 28, 1991, now U.S. Pat. No. 5,260,123.

TECHNICAL FIELD OF THE INVENTION

This invention relates to new copolymers with elastomeric properties which are alternating block copolymers derived from polysiloxanes and copolymers of a conjugated diene and an aromatic vinyl compound. The invention also relates to elastomeric structures having release characteristics wherein at least a portion of the surface of the elastomeric structure comprises the alternating block copolymers of the present invention.

BACKGROUND OF THE INVENTION

Copolymers of organopolysiloxane with various materials have been described previously. For example, block copolymers of organopolysiloxane and resins such as polystyrene have been described in U.S. Pat. Nos. 3,051,684; 3,483,270; 3,760,030; and 4,677,169. Block copolymers of silicones with vinyl pyridine have been described in U.S. Pat. Nos. 3,673,272 and 3,875,254. Block polymers of polysiloxanes and dienes such as polybutadienes are described in U.S. Pat. No. 3,928,490. The '490 block polymers are prepared by joining linear high molecular weight polysiloxane and a butadienyl dilithium initiator or catalyst in a solvent to form the desired linear block copolymer. In U.S. Pat. Nos. 3,051,684 and 3,483,270, cyclic tri- and tetrasiloxanes are described as reactive with diene or vinyl monomers to form block copolymers containing siloxane and polydiene or polyvinyl blocks, respectively.

A clean and facile release of manufactured rubber articles and process goods from the flexible machinery components contacted during the manufacturing process is a critical feature of such processes. The undesirable adhesion of such articles and goods to the machinery components may result in unnecessary delays in the production schedule and/or damaged goods due to the force required to separate the goods from the machinery components when the process is completed.

The problem of releasing manufactured rubber articles from machinery components is particularly prevalent with elastomeric and flexible structures or components such as conveyor belts and devices such as flexible diaphragms, bags, bladders, sleeves, etc. which are often made of elastomeric materials such as rubber which possess a natural stickiness or tack. It is desirable, therefore, to provide elastomeric materials having both controlled surface release characteristics and elastomeric flexible properties, i.e., flexible surfaces with reduced tack or stickiness.

Many of the suggestions which have been made in the prior art for providing a convenient, safe and economical means for controlling the natural surface tack or stickiness of flexible elastomeric structures and machinery components generally involve depositing a release coating on the flexible surface which contacts the articles or goods. Various materials have been suggested in the art as release materials of films, and these include, for example, mica, polymeric polyols, cellulose ethers, clay such as bentonite, and silicone lubricants. Such release materials are generally applied to the elastomeric material by painting, dusting, dipping or spraying of the article.

U.S. Pat. No. 4,853,069 describes an elastomeric structure wherein the release characteristics are controlled with a surface coating comprising a chloro-sulfonated polymer and a reinforcing filler. An aqueous emulsion useful as a lubricant for tire-curing bladders is described in U.S. Pat. No. 4,533,305. The lubricant composition comprises a mixture of polydimethylsiloxane; at least one silane selected from methyl hydrogen silane, dimethyl hydrogen silane and methyl trimethoxy silane; a surfactant; water; and optionally, a metal salt of an organic acid.

Machines for the assembly (forming) of tires (TAMS) contain elastomeric structures such as inflatable rubber bladders which are conventionally used for such manufacturing operations as turning up ply ends over bead rings and against plies on the TAM mandrel or drum. These rolling, inflatable turn-up bladders (TUBS) turn the ends of the plies wrapped on the tire building mandrel up around the bead rings and over them against the ply material. The rubber ply material of the tire stock is tacky by nature, and it is this tack which causes the plies to stick together and thus maintain the integrity of the partially built or green tire. The TUBS are conventionally made from vulcanized rubber with optional fabric reinforcement, and the tacky ply ends of the tire stock have a tendency to adhere to the outer surface of the bladder which turns them up, particularly, since the inflated bladder exerts pressure on the turned-up ply ends. This adhesion tends to retard the subsequent retraction of the deflated bladders, and it can also result in erosion of the bladder material coming in contact with the ply ends. Thus it is desirable to provide TUBS with surfaces which are non-adhesive or releasing to the tire plies with which they may come in contact. One solution to this problem is found in U.S. Pat. No. 4,381,331 to Johnson, which describes a ply turnover bladder having at least a portion of its outer surface comprising a fabric layer of spaced cords calendered with a coating of unvulcanized, uncured rubbery polymer, the spaces between the cords being free of said polymer at the surface so that the cords project above said surface. It has been found that this structure has reduced tendency to adhere to the rubber ply of tire components and thus release the tire during its manufacture.

Another related embodiment of this invention is found in tire curing bladders having an outer releasing surface coating and in a method of curing tires utilizing such coated bladders. Conventionally, pneumatic rubber vehicle tires are produced by molding and curing a green or uncured and unshaped tire in a molding press. In the press, the green tire is pressed outwardly against the mold surface by means of an inner, fluid-expandable bladder. By this means the green tire is shaped against the outer mold surface which defines the tires tread pattern and configuration of the sidewalls. Generally the bladder is expanded by internal pressure provided by a fluid such as hot gas, hot water, and/or steam. The use of such tire curing bladders is well known in the art of tire manufacture. It is also known that difficulties may occur between the bladder and the inner surface of the tire if there is excessive adhesion, that is, the lack of release between the two. Typically, this results in deterioration of the bladder, misshaping of the tire in the mold, and similar problems. Furthermore, air bubbles can potentially become trapped between the bladder and tire surfaces and promote tire vulcanization defects. For this reason, it is conventional practice to precoat the inner surface of the green or uncured tire with a lubricant in order to provide lubricity between the outer bladder surface and the inner tire surface. Such lubricants have sometimes been called lining cements, band ply dopes and bag dopes. Conventionally, the inner surface of the green tire, which is typically a rubber gum stock, is simply spray coated with a lubricant which might, for example, be based on silicone polymers. Other additives may also be conventionally utilized in this application, such as mica, polymeric materials, polyols, polyethers, clays, and the like. Another approach to this problem is the alternative of coating the bladder itself. One such example of a tire curing bladder lubricant is found in U.S. Pat. Nos. 4,359,340 and 4,533,305, both to Comper et al, which describe an aqueous lubricating composition for tire curing bladders containing polydtmethylsiloxane, a silane, a surfactant and, optionally, a metal salt of an organic acid.

Still another means of solving the problem of undesirable adhesion between tacky tire plies and similar elements and flexible TAM components such as bladders and sleeves is the so-called Red Release coat developed by The Firestone Tire & Rubber Company. This coat consists of a polymeric film formed from a fluxed (that is, heat-treated) blend of PVC and a copolymer of butadiene and acrylonitrile (for example, Paracril OZO). This material is available as a thin sheet that is cemented to the bladder or sleeve on which the release coating is desired.

SUMMARY OF THE INVENTION

Block copolymers are described which comprise alternating blocks of (A) a polysiloxane; and (B) a copolymer of a 1,3-conjugated diene and a monovinyl aromatic compound. The block copolymers can be prepared by reacting a polysiloxane with a dilithiated copolymer of a conjugated diene and a monovinyl aromatic compound and thereafter neutralizing the reaction product, preferably with a protonic acid. Cured elastomer compositions exhibiting both elastomeric properties and surface release characteristics are obtained by curing a mixture comprising the above-described block copolymers in the presence of a curing system comprising a peroxide and sulfur. Multilayer elastomer structures useful in manufacturing articles from elastomeric materials also are described wherein at least a portion of an outer layer of the multilayer elastomer structure has release characteristics and comprises the cured block copolymers of the present invention.

DESCRIPTION OF THE PREFERRED EMBODIMENTS

Figure 1:
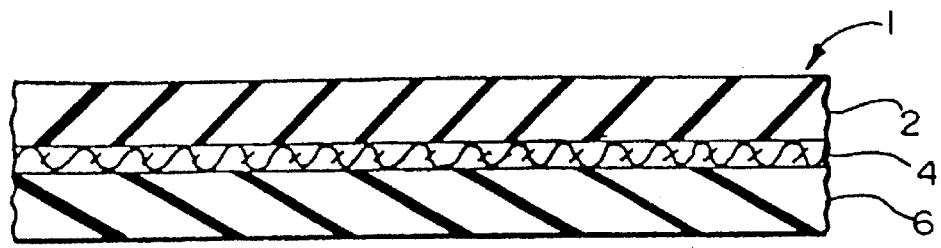
FIG. 1 is a schematic sectional view of a multilayer structure of the invention.

In one embodiment, the present invention is a block copolymer comprising alternating blocks of (A) a polysiloxane; and (B) a copolymer of a conjugated diene and a monovinyl aromatic compound. The block copolymers generally are linear and will comprise from about 10 to about 75% by weight of the polysiloxane and from about 25 to about 90% by weight of the copolymer (B). The amount of polysiloxane included in the block copolymer may be varied depending upon the intended use for the block copolymer. In one embodiment, the block copolymers will comprise from about 20 to about 50% by weight of the polysiloxane blocks with the balance being blocks of copolymer (B). In one preferred embodiment, the block copolymers consist essentially of polysiloxane blocks and copolymer (B) blocks.

The block copolymers of the present invention can be prepared generally by reacting a linear high molecular weight polysiloxane with a dimetallated copolymer of a conjugated diene and a monovinyl aromatic compound. The dimetallated copolymer is obtained by anionically polymerizing a 1,3-conjugated diene and an aromatic vinyl compound in the presence of a metal catalyst or initiator. The metal may be an alkali metal and is preferably lithium.

(A) Polysiloxane Block

The polysiloxane portion or blocks of the block copolymer of the present invention may be represented by the formula

$$—[Si(R)_2O]—_x \qquad (I)$$

wherein each R is independently a hydrocarbyl group bonded directly to the silicon atom and containing 1 to about 18 carbon atoms, and x is from about 100 to about 6000. More often each R is independently an alkyl, aryl, cycloalkyl, cycloalkenyl, alkenyl or aralkyl group containing up to 12 carbon atoms. Examples of the R groups include alkyl groups such as methyl, ethyl, propyl, butyl, isobutyl, n-hexyl and n-octyl; aryl groups such as phenyl, naphthyl and biphenyl; aralkyl groups such as benzyl and phenethyl; alkaryl groups such as tolyl, xylyl and ethyl phenyl; halogenated aryl groups such as chlorophenyl, tetrachlorophenyl; chloronaphthyl and tetrafluorophenyl; and cyanoalkyl groups such as beta-cyanoethyl, etc. Preferably, each R is an alkyl containing from 1 to 4 carbon atoms or a phenyl group. Siloxanes in which both R groups are methyl groups or one is methyl and the other is phenyl are particularly preferred.

The polysiloxanes used to form the block copolymers generally are fluids and may be represented by the formula

$$—[Si(R)_2O]—_a \qquad (II)$$

wherein each R is as defined with respect to Formula I, and a is from about 1400 to about 10,000. It has been observed that the molecular weight of the polysiloxane blocks in the block copolymer is less than the molecular weight of the high molecular weight polysiloxane which is reacted with the dimetallated copolymer to form the block copolymer elastomer of the invention. It is believed that the reaction with the dimetallated copolymer results in a degradation of the polysiloxane. Thus x in Formula I is generally less than a in Formula II.

The organo polysiloxane portion of the block copolymer of the present invention also can be derived from cyclic organo siloxane reactants such as substituted cyclotrisiloxanes and cyclotetrasiloxane which produce polysiloxane blocks by ring-opening polymerization. Useful cyclotrisiloxanes are represented by the formula

(III)

wherein each R is as defined above with respect to Formula I. Hexamethyl cyclotrisiloxane available from Aldrich Chemical Company, Inc. is an example of a cyclic trisiloxane useful in the present invention, and octamethylcyclotetrasiloxane (also available from Aldrich Chemical Company) is an example of a useful cyclotetrasiloxane for forming the block copolymers of the present invention. Other examples include: 1,3,5-trimethyl-1,3,5-triphenylcyclotrisllloxane; 1,3,5-trimethyl-1,3,5-triethylcyclotrisiloxane; 1,3,5,7-tetramethyl-1,3, 5,7-tetra-n-propylcyclotetrasiloxane; etc. Both the cyclic and linear siloxanes used to prepare the copolymers of this invention are known materials and in many instances commercially available under the general tradename "silicones".

(B) Copolymer

The copolymers useful in preparing the block copolymers in the present invention are copolymers of a 1,3-conjugated diene monomer and a monovinyl aromatic monomer. The relative amount of conjugated diene and aromatic vinyl monomers included in the copolymers may be varied over a wide range depending upon the desired copolymer properties. Thus, the amount of conjugated diene in the copolymer may vary from 10 to about 90% by weight and the amount of aromatic vinyl compound from about 10 to about 90% by weight. More generally, the copolymers will comprise from about 50 to about 90%, preferably from about 60 to about 80% by weight of the conjugated diene and from about 10 to about 50% by weight, more preferably from about 20 to about 40% by weight of the aromatic vinyl compound. The vinyl content (1,2-content) of the copolymers formed and used in this invention will generally be in the range of about 10 to about 50 or 60% by weight. The vinyl content can be varied by one skilled in the art to result in copolymers having desired properties such as glass transition temperature, etc. The glass transition temperatures of the block copolymers of this invention are generally below −5° C. and more often are between about −10° to −50° C.

The copolymers useful in the present invention are prepared by polymerizing a mixture of a 1,3-conjugated diene monomer and a monovinyl aromatic monomer in the presence of a metallic catalyst under anionic conditions which is effective to produce a dimetallated copolymer intermediate. The catalyst preferably is an organo metallic compound wherein the metal is an alkali metal including lithium, sodium, potassium, rubidium, cesium or francium. Lithium is a preferred metal. In general, the catalyst may be an alkyl dimetal compound containing from 1 to 8 or 10 carbon atoms, metal biphenyls and metal naphthalenes. Specific examples include lithium biphenyl, lithium naphthalene, 1,4-dilithiobutane and 1,5-dilithiopentane. As noted above, it is important to the present invention that the catalysts utilized in the copolymerization reaction is of the type which will form initially a dimetallated, preferably, a dilithiated copolymer of the 1,3-conjugated diene and the monovinyl aromatic monomer.

The conjugated diene monomers useful in the process of this invention generally are 1,3-dienes, and typically they are acyclic and contain from 4 to 12 carbon atoms and preferably from 4 to 8 carbon atoms per molecule. Examples of such dienes include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-butadiene, 2,3-di-n-propyl-1,3-butadiene, 2-methyl-3-isopropyl-1,3-butadiene, and the like. Among the dialkyl butadienes, it is preferred that the alkyl groups contain from 1 to 3 carbon atoms. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene.

The monovinyl aromatic compounds include styrene, 1-vinyl-naphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Generally the total number of carbons in these monovinyl aromatic compounds is 8 to about 12. Examples of these substituted aromatic monomers include p-methylstyrene, alpha-methyl-styrene, 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 2,3,4,5-tetramethylstyrene,4-(4-phenyl-n-butyl)styrene,3-(4-n-hexylphenyl)styrene, 4-methoxystyrene,3,5-diphenoxystyrene,2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinyl-naphthalene, 2,4-diisopropyl-1-vinyl-naphthalene, 3,4,5,6-tetramethyl-1-vinylnaphthalene, 3,6-di-n-hexyl-1-vinyl-naphthalene,8-phenyl-1-vinyl-naphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2vinyl-naphthalene, 6-benzyl-2-vinylnaphthalene,3-methyl-5,6-diethyl-8-n-propyl-2-vinyl-naphthalene, 4-p-tolyl-2-vinylnaphthalene, 5-(3-phenyl-n-propyl)-2vinylnaphthalene,4-methoxy-1-vinylnaphthalene, 6-phenoxyl-1-vinylnaphthalene, 3,6-dimethylamino-1-vinylnaphthalene, and the like. Other examples of vinyl substituted aromatic compounds are found in U.S. Pat. No. 3,377,404, the disclosure with respect to which is incorporated herein by reference. Preferred aromatic vinyl compounds include the various styrenes, particularly, styrene (i.e., vinyl benzene) itself.

Preferred copolymers are those obtained from 1,3-butadiene, isoprene or piperylene with styrene. More particularly, copolymers of 1,3-butadine and styrene are preferred. These copolymers are generally known in the art as styrene-butadiene rubbers, i.e., SBRs.

The copolymers of the conjugated diene and monovinyl aromatic compounds may be prepared by techniques well known to those skilled in the art, and suspension polymerizations as well as solution polymerizations are contemplated. In one embodiment, the polymerization is a solution polymerization reaction which takes place in an inert organic diluent in which the monomers and catalysts are soluble. Many suitable inert diluents are known in the art and those diluents generally preferred are alkanes or other non-polar solvents. Suitable solvents include ethane, propane, isobutane, n-butane, isopentane, n-pentane, n-hexane, n-heptane, isooctane, n-octane, cyclobutane, cyclopentane, cyclohexane, benzene, toluene, etc. Mixtures of these solvents may be used.

The concentration of the monomers in the solvent may be varied over a wide range such as from about 2 to about 50% by weight or more. The concentration of monomers is generally dependent upon economics, the ability to control reaction conditions and the ability to process the polymer solutions. The use of monomer concentrations ranging from between 15 to about 25 weight percent is generally practical. These copolymers generally exhibit elastomeric properties.

The block copolymer compositions of the present invention are obtained by the reaction of the dimetallated copolymer reactants described above with the polysiloxanes described above. The polysiloxane generally is added to a solution of dimetallated copolymer as a solution in a dry aromatic solvent such as benzene or toluene. Upon completion of the reaction, the solution can be neutralized with a protonic acid such as aqueous acetic acid or a mineral acid to form terminal silanol bonds which will then spontaneously couple under the reaction conditions to produce the desired alternating block copolymer. After neutralization, the desired copolymer may be recovered by evaporation of the solvents or by precipitation in non-solvents such as an alcohol. Examples of useful alcohols include methanol, ethanol, isopropyl alcohol, etc.

Alternatively, the product obtained by the reaction of the dimetallated copolymer with the polysiloxanes described above or the silanol end groups containing intermediate described above can be neutralized with a polyfunctional organosilane of the general formula $$R'_y SiX_z \tag{IV}$$

wherein each R' is independently an alkyl, aryl, or aralalkyl group, and each X is a group which is reactive with the alkali metal or which will remove the hydroxyl terminal of the silanol intermediate, without affecting the remainder of the block copolymer, y is a number from 0 to 2 and z is a number from 2 to 4 provided that the sum of y and z is 4. Included among these X groups in Formula (IV) are acyloxy groups, such as acetoxy, halogen substituents such as chloro, and aminoxy substituents. Preferably each R' is an alkyl group such as methyl or ethyl, each X is a halogen such as chlorine, y is 2 and z is 2. When y and z are each 2, the silane can function as a coupling agent. Specific materials which can be so employed include diphenyl diacetoxysilane, dimethyldiacetoxysilane, dimethyldichlorosilane, methyltrichlorosilane, tetra chlorosilane, and mixtures thereof. This reaction proceeds relatively quickly under standard conditions.

Although not wishing to be bound or limited by any discussion of possible reaction schemes, it is believed that the reaction of the dimetallated copolymer with the polysiloxane forms a dimetallated intermediate which can be represented as follows

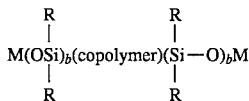

$$\tag{V}$$

wherein M is a metal, each R is as defined in (I) each "copolymer" is the copolymer (B) described above, and each b is less than x of Formula (I), more generally x is less than a of Formula (II). In one embodiment b may be from about 50 to about 3000. On neutralization with an acid the metal is removed and terminal silanol groups are formed. Coupling may occur to form a linear block copolymer represented as follows

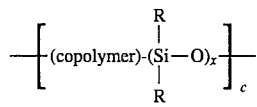

$$\tag{VI}$$

wherein x is from about 100 to about 6000 and c is a number from 2 to about 20. When the dimetallized intermediate (V) (or the neutralized derivative containing terminal silanol bonds) is reacted with a coupling agent such as R'$_2$SiX$_2$ as defined above, the linear block copolymer formed may be represented by the formula

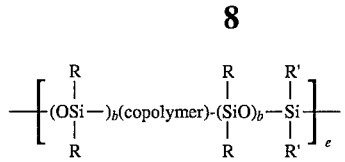

wherein b is as defined in Formula (V), and e is from about 2 to about 20.

The copolymerization of the conjugated diene and vinyl aromatic compound provides a dimetallated copolymer having a molecular weight of between about 1000 and 100,000 or higher depending upon the properties desired to be imparted to the block copolymers of the invention. More often, the number average molecular weight of the conjugated diene-vinyl aromatic copolymer block will be in the range of from about 25,000 to about 75,000.

Unless specifically stated otherwise, the molecular weights of the various copolymers reported herein are determined by gel permeation chromatography (GPC) according to techniques well known to those skilled in the art. The equipment, software and procedures are supplied by Waters Chromatography Division, Millipore Corporation, 34 Maple Street, Milford, Mass., 01757 U.S.A. Determinations are made using organic preparative-grade GPC. Styragel (cross-linked polystyrene) columns. Samples of the polymers are dissolved in tetrahydrofuran (THF) stabilized with an antioxidant such as dibutylparacresol and injected into a GPC. apparatus equipped with four metal-clad Waters columns. In particular, GPC. molecular weight determination with the copolymers of the present invention are made using a Model 200 Waters Gel Permeation Chromatograph retrofitted with a Waters M-45 pump, a R-410 Differential Refractometer, a Hewlett-Packard Electropen Recorder, and a Waters Wisp Injector System. Four Waters Styragel columns are used, all 7.8 mm diameter×1220 mm long, and packed with Styragel, successively having nominal pore sizes of $10^6$, $10^5$, $10^4$ and $10^3$ Å. Polymer samples (0.20 gram) are placed in a flask with 20 ml. of stabilized THF, stoppered, and allowed to stand overnight to complete solution of the polymer. The samples are then filtered through depth filters of 0.25 micron pore size made of diatomaceous earth-filled cellulose media (Waters P/N 37962) using nitrogen pressure and loaded into the Wisp injector. A 0.7 ml. sample of the THF-polymer solution is selected and a run time of 187 minutes used. The flow rate of THF through the chromatograph is set at 1 ml. per minute, and after equilibrium is obtained, the copolymer sample solutions are injected. Samples are chromatographed at room temperature and detection of the eluted polymer fractions made by refractometer measurements made at 38° C. Overlapping injection at two-hour intervals is used; this is accomplished using two data collection interfaces. The molecular weight separation which is obtained is measured with the Differential Refractometer, and calculations of molecular weight parameters are carried out using computer programs. The software used in these determinations is Waters Expert LC/GPC. multi-system software, version 6.2 (Jan. 15, 1988), Waters P/N 87663. Universal Calibration is carried out with narrow distribution polystyrene standards obtained from Pressure Chemical Corporation to generate second and third order calibration curves. Mark-Houwink constants developed for completely soluble linear butadiene-styrene-type polymers (THF) are used to relate the observed data to the reported values. The constants, K and α, are 2.69×10$^{-4}$ and 0.73 respectively for Mn and 3.80×10$^{-4}$ and 0.70 respectively for Mw. These GPC. molecular weight values are estimated to be accurate within 10–20% in absolute sense and more precise on a relative basis. In this manners Mn, Mw and Mz can be determined. Dispersity is Mw/Mn. The use of the Mark-Houwink equation allows calculation of viscosity average molecular weight (Mv) and intrinsic viscosity.

Values reported herein regarding the microstructure of the copolymers and block copolymers such as 1,2-content, 1,4-content, percent styrene, percent siloxane, etc., are determined using proton nuclear magnetic resonance in either $C_2Cl_4$ or $CDCl_3$.

Processing conditions such as the initial and maximum temperature of the polymerization reaction, the concentration of catalysts, etc., can be varied as desired by one skilled in the art to produce copolymers having desired properties and characteristics. For example, the conditions can be controlled to produce copolymers having a desired 1,2-microstructure (vinyl structure) such as from about 20 to about 95%. Generally, the processing conditions will be selected to provide copolymers of the diene and aromatic compound having a vinyl content in the range of from about 10 to about 50 or 60% by weight. The copolymerization of the diene monomer with the vinyl aromatic compound may be effected in ambient temperature although preparation of the polymers of the present invention by solution polymerization techniques can be conducted at temperatures of 0° C. to about 160° C. At the lower temperatures, the copolymers obtained generally contain higher amounts of the 1,2-microstructure (vinyl). When the reaction is to be conducted as a batch operation, initiation temperatures of less than 90° C. are preferred.

When the desired dimetallated (dilithiated) copolymer has been formed, the block copolymer of the present invention may be obtained by either adding the polysiloxane to the solution of the dimetallated copolymer, or a solution of the dimetallated copolymer can be added to polysiloxane. Generally, however, the polysiloxane is added to the solution of the dimetallated copolymer as a solution in dry benzene (or other aromatic solvent) solution. The polysiloxane reacts with the live dimetallated copolymer. The starting temperature of the block copolymerization usually is the temperature at which the live copolymer is produced. Upon completion of the addition of the polysiloxane, the reaction mixture generally is heated to an elevated temperature for a period of from 0.5 to about 5 hours to complete the reaction. As will be apparent to those skilled in the art, both the preparation of the dilithiated copolymer (B) and its subsequent reaction with the polysiloxane are conducted under essentially moisture-free (i.e., anhydrous) conditions.

The reaction mixture then is neutralized with a protonic acid such as acetic acid, which may be diluted in an aliphatic solvent. The neutralization reaction forms terminal silanol bonds which then spontaneously couple through formation of silicon-oxygen-silicon moieties under the neutralization conditions to form the desired alternating block copolymer. The block copolymer thus formed may be recovered by evaporation of the solvent or by precipitation from a non-solvent such as an alcohol. Examples of non-solvent alcohols include methanol, ethanol and isopropanol. Methanol is a preferred non-solvent for precipitating the block copolymers of the present invention.

The block copolymers of the present invention comprising alternating blocks of (A) a polysiloxane, and (B) a copolymer of a conjugated diene and a monovinyl aromatic compound may be characterized as follows: from about 10 to about 75% by weight of polysiloxane; from about 10 to about 25 or 30% by weight of styrene; from about 15 to about 40 or 50% by weight of vinyl groups; Mn values of from 100,000 to about 500,000 or higher; and Mw/Mn values of less than 2 and more often from about 1.5 to about 1.9.

The following examples illustrate preparation of the block copolymers of the present invention. Unless otherwise indicated in the examples and elsewhere in the specification and claims, all parts and percentages are by weight, temperatures are in degrees centigrade and pressures are at or near atmospheric pressure.

EXAMPLE 1

A lithium naphthalene catalyst is prepared by adding 9.6 grams (0.075 mole) of naphthalene and 1.84 grams (0.265 mole) of lithium wire to a 7 ounce bottle. After purging with argon, the total volume was raised to 100 cc. by the addition of dry tetrahydrofuran. After a few minutes, the characteristic green color of the catalyst is observed, and the temperature of the bottle increases slightly. The bottle and its contents are cooled with tap water for one hour and then overnight in a refrigerator. In this manner, a 0.75 molar tetrahydrofuran solution of the lithium naphthalene radical anion is obtained.

A mixture of 1.2 cc. (0.9 mM of Li) of the above solution and 179.7 grams of a 25% blend of styrene/butadiene (25/75) in hexane is prepared and rapidly polymerizes at 50° C. over a period of 3 hours. In a separate bottle, 30 grams of a high molecular weight polydimethylsiloxane (Dow Corning Silastic 4-2735) is dissolved in 300 cc. of dry toluene. Any water present is removed by heating to 140° C. while the bottle is vented. About 5% of the solvent is distilled along with any azeotrope of water that is present. The bottle is cooled and the contents are pressurized with nitrogen.

The siloxane solution thus prepared is transferred into the dilithiated styrene-butadiene copolymer solution, and after 16 hours at about 50° C., the temperature is raised to 70° C. for an additional 4 hours to complete the reaction. The reaction mixture is then hydrolyzed with 0.1 cc. of 14.7M acetic acid and 4 cc. of an antioxidant blend are added. The resulting solution is thoroughly mixed and drained into a pan to evaporate the solvent. After vacuum drying of the residue, the residue is analyzed and the results are summarized in Table I below.

EXAMPLE 2

A mixture of 0.97 pound of a 33% solution of styrene in hexane (145 grams of styrene), 3.77 pounds of a 24.5% solution of butadiene in hexane (419 grams of butadiene) and 1.3 pounds of hexane is prepared in a reactor. To this mixture there are added 17 cc. of a 0.75M lithium naphthalene in tetrahydrofuran at a temperature of about 50° C. while cooling the exothermic reaction mixture to maintain the temperature at about 50° C. for a period of 3 hours.

A toluene solution (10% wt/v) of Silastic 4-2735 from Dow Corning is prepared by dissolving 62.7 grams of the siloxane in a total volume of 627 cc. in each of six 28-ounce bottles. After dissolution, the bottles are heated at 120°–140° C. and vented for at least five minutes using a nitrogen purge to remove the last traces of water. The six bottles are added to an 8-liter tank and pressure transferred into the reactor containing the dilithiated copolymer. The temperature within the reactor is increased to 70° C. for one hour, and 0.88 cc. of 14.7M glacial acetic acid (in hexane) is added. After 15 minutes, the reactor is cooled and the reactor contents are precipitated from methyl alcohol containing an antioxidant. The precipitate is the desired block copolymer.

The block copolymers obtained from two runs are analyzed, and the results are summarized in Table I.

TABLE I

Properties of Block Copolymers

|  | Example 1 | Example 2 Run 1 | Example 2 Run 2 |
|---|---|---|---|
| GPC Analysis |  |  |  |
| Mn | 126,000 | 308,000 | 370,000 |
| Mw/Mn | 1.87 | 1.76 | 1.58 |
| Microstructure (% w)[1] |  |  |  |
| 1, 2-units (vinyl) | 25.5 | 21 | 18 |
| 1, 4-units | 36.1 | (2) | (2) |
| 1, 2-(BD base) | 41.7 | 47.7 | 41.9 |
| Styrene | 24.0 | 16 | 18 |
| Styrene (SBR base)[3] | 28.0 | 27.1 | 29.5 |
| Block Styrene | 0 | 0 | 0 |
| Dimethyl siloxane | 14.4 | 41 | 39 |

[1] Measured by proton NMR
[2] Not measured
[3] % styrene in styrene butadiene dilithiated intermediate The block copolymers of polysiloxanes and copolymers of conjugated dienes and aromatic vinyl compounds of this invention, alone or blended with other rubbery polymers, may be mixed with various compounding agents such as fillers, carbon blacks, processing oils, curing or vulcanizing agents, vulcanizing accelerators, antioxidants, other elastomeric adjuvants, etc., to form curable elastomeric compositions having desirable properties. In particular, as described more fully below, cured compositions containing the block copolymers of the present invention exhibit desirable surface release characteristics especially towards other elastomers such as uncured natural or synthetic rubber.

The curable elastomer compositions of the present invention may contain, in addition to the block copolymers described above, at least one additional natural or synthetic rubber including solution and emulsion SBR's. Thus, in one embodiment, the elastomer component of the elastomer compositions may comprise from about 10 to about 100% by weight of the block copolymers of the present invention described above and from 0 to about 75 or even 90% by weight of another rubber. Examples of synthetic rubbers include rubber-like polymers produced by polymerizing aliphatic, conjugated diolefins, especially those containing 4 to 8 carbon atoms such as butadiene, isoprene pentadienes, etc. The rubbers contain unsaturated carbon chains, and such rubbers are known in the art as shown by ANSI/ASTM Standard D1418-85A where these rubbers are referred to as R rubbers. The following is a non-exclusive list of R class rubbers which can be used with the block copolymer in the elastomer compositions of this invention.

ABR—Acrylate-butadiene
BR—Butadiene
CIIR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SBR—Styrene-butadiene rubber
SCR—Styrene-chloroprene
SIR—Styrene-isoprene rubbers Of these, the NR or SBR are typically used. Compositions containing the block copolymer of this invention and SBR (solution) as the rubber portion are often used since the SBR is compatible with the block copolymer containing SBR blocks.

The rubbers used herein having carbon-carbon unsaturation also may be other than the above-described R rubbers. Examples of such rubbers include EPDM and EPR. EPDM rubbers are derived from ethylene-propylene-diene monomer and generally about 3 to 8% of their carbon bonds are unsaturated bonds.

The curable and cured elastomer compositions prepared in accordance with the present invention may and generally do contain at least one filler material which is preferably a reinforcing filler material. Reinforcing filler materials used in the practice of the present invention are well known to those skilled in the art. See, for example, the *Vanderbilt Rubber Handbook*, published by the R. T. Vanderbilt Company of Norwalk, Conn., U.S.A. (1978), particularly pages 347–349. Typical fillers include carbon blacks and silica. The amount of filler incorporated into the curable elastomer composition may range from 0 up to about 100 parts by weight or higher per 100 parts by combined weight of block copolymer and other rubber.

The carbon black fillers useful in the elastomer compositions of this invention include any of the commonly available, commercially-produced carbon blacks but those having a surface area (EMSA) of at least 7 $m^2/g$ and more preferably at least 35 $m^2/g$ up to 200 $m^2/g$ or higher. Surface area values used in this application are those determined by ASTM test D-1765 using the cetyl-trimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following Table II.

TABLE II

Carbon Blacks

| ASTM Designation (D-1765-82a) | Surface Area ($M^2/g$) (D-3765) |
|---|---|
| N-110 | 126 |
| N-220 | 111 |
| N-339 | 95 |
| N-330 | 83 |
| N-550 | 42 |
| N-660 | 35 |

The carbon blacks may be in pelletized form or an unpelletized flocculent mass. Preferably, for more uniform mixing, unpelletized carbon black is preferred.

Other reinforcing materials such as fumed silica, silicon dioxide and various types of clays known to those skilled in the art to exert reinforcing action on elastomer compositions containing them can also be used. Modified carbon blacks, particularly those modified with organo nitrogen compounds can also be used as can other plaque reinforcing fillers such as bituminous fine black, ground the pulverized anthracites and other mineral blacks.

The curable elastomer compositions of the present invention also contain a chemical curing system which is suitable for promoting the curing (or vulcanization) of the composition, and particularly curing of the polymers contained in the composition. Sulfur-based curing systems (i.e., sulfur-containing compounds having available sulfur) can be utilized, particularly those also containing conventional amounts of nitrogen-containing accelerator and activator compounds. Examples of sulfur-containing compounds, in addition to sulfur, include disulfides, alkyl phenol sulfides, para-dinitrosobenzene, sulfur dichloride, tetramethyl thiuram disulfide, tetraethyl thiuram disulfide, etc. Peroxide systems also can be utilized for curing the elastomer compositions of the present invention, and these include di-(alpha-cumyl) peroxide, benzoyl peroxide, bis-(2,4-dichlorobenzoyl) peroxide, tertiary butyl perbenzoate, bis-(t-butyl peroxy)diisopropylbenzene, t-butyl perbenzoate, etc.

In a preferred embodiment, the curing system utilized for curing the elastomer compositions containing the block copolymers of this invention comprises mixtures of sulfur and peroxide catalysts. Particularly useful peroxides used in combination with sulfur in the curing systems of the present invention include bis-(t-butyl peroxy)-diisopropyl benzene and dicumyl peroxide. When mixtures of sulfur and peroxides are used as the curing system, from about 0.1 to about 1 part of sulfur and from about 2 to about 4 parts of the peroxide are incorporated into the elastomer systems. More often, the amount of sulfur will range from about 0.1 to about 0.5 part, and the amount of peroxide will vary from about 2 to about 4 parts per 100 parts of rubber in the elastomer composition.

The vulcanizable elastomer compositions of the present invention may, and generally will contain at least one vulcanization accelerator. Conventional vulcanization accelerators such as those of the sulfonamide series, guanidine series, thiuram series, etc., may be utilized in amounts of from 0.2 to about 3 parts by weight per 100 parts by weight of the starting rubber. Suitable accelerators include 2-mercaptobenzothiazole, dibenzothiazyldisulfide, mercaptobenzothiazylsulfenamide and N-cyclohexyl-2-benzothiazylsulfenamide.

The curable elastomer compositions of the present invention also may contain a processing oil which also may serve as an extender for the block copolymer and any other natural or synthetic rubber included in the elastomer compositions of the present invention. Any oil which is compatible with and capable of extending the rubber compositions can be used. Thus, the oils may be either natural or synthetic oils. Natural oils include petroleum base oils such as mineral oils. The oils may be naphthenic, paraffinic or aromatic oils, or mixtures thereof.

Examples of synthetic oils which may be utilized as processing or extender oils in the elastomer compositions of the present invention include synthetic silicone oils such as those available from the Dow Corning Corporation under such designations as DC-190 silicone, DC-200 silicone, etc. DC-190 oil is believed to be silicone glycol copolymer. DC-200 silicone oil is reported to be a dimethylpolysiloxane fluid. The amount of processing or extender oils present in the vulcanizable compositions of the present invention may vary over a wide range, and the particular amount preferred for particular compositions can be readily determined by one skilled in the art. Generally, when an oil is to be included in the elastomer compositions, there will be present in amounts of from about 1 to about 30 parts by weight per 100 parts of rubber although larger amounts may be utilized.

The vulcanizable elastomer compositions may also contain coupling agents normally used for coupling the silica filler to the block copolymer. An example of a typical coupling agent is bis-3-(triethoxysilyl) propyl tetrasulfide.

The curable (vulcanizable) elastomer compositions containing the block copolymers of the present invention can be prepared by conventional techniques using various types of mills, blenders and mixers known in the art.

A general and a typical compounding recipe for preparing the curable and the cured elastomer compositions of this invention having surface release characteristics are shown in Table III.

TABLE III

Elastomer Compounding Recipe

| Ingredient | PHR (wt) | | |
|---|---|---|---|
| | General | Usual | Typical |
| Elastomer | | | |
| Block Copolymer* | 10–100 | 40–90 | 75 |
| Other rubber (e.g., SBR)* | 0–90 | 20–50 | 25 |
| Carbon Black | 5–100 | 15–60 | 30 |
| Silica | 5–50 | 10–40 | 20 |
| Processing Oil | 1–30 | 10–30 | 15 |
| Zinc Oxide | 3–10 | 3–7 | 5 |
| Stearic Acid | 1–3 | 1–2 | 2 |
| Antioxidant | 1–3 | 1–2 | 2 |
| Sulfur | 0.1–2 | 0.1–1.0 | 0.3 |
| Supported Peroxide** | 2–5 | 2.5–4.5 | 3.75 |
| Accelerator | 0.5–5 | 0.5–4 | 1.0 |

*Sum of block copolymer and other rubber equals 100.
**40% by weight supported peroxide on inert filler.

The cured elastomer compositions of the present invention are made by curing or vulcanizing the curable elastomer mixtures described above under conditions of temperature and time customarily used in the art. Typically, the curable elastomer compositions are cured by heating at an elevated temperature such as from about 125° to about 200° C. for periods of from about 5 minutes to about 1 hour or more.

The following examples illustrate specific curable and cured elastomer compositions of the present invention. An internal mixer such as a Brabender or small Banbury, and a roll mill used to prepare the uncured rubber formulations in accordance with techniques well known to those skilled in the art.

| | Parts/Wt. |
|---|---|
| Block copolymer prepared as in Ex. 2 | 100 |
| HAF black (N-330) | 20 |
| Fumed silica | 20 |
| Zinc oxide | 5 |
| Stearic acid | 2 |
| DC-200 silicone oil | 15 |
| Tri(nonylphenyl) phosphite | 1.5 |
| Santocure NS* | 0.6 |
| Sulfur | 0.75 |
| Vulcup 40KE** | 4.0 |

*N-t-butyl-2-benzothiazylsulfenamide
**bis-(t-butylperoxy)-diisopropyl benzene

The resulting uncured composition is calendered to a sheet (0.020-inch thick) which is cured for 40 minutes at 160° C. The sheet exhibits excellent surface release from uncured tires.

|  | Parts/Wt. |
| --- | --- |
| Block copolymer prepared as in Ex. 2 | 75 |
| Solution SBR (HX673 available from Bridgestone/Firestone) | 30* |
| Fumed silica | 20 |
| HAF black (N-330) | 30 |
| DC-200 silicone oil | 14 |
| Zinc oxide | 5 |
| Stearic acid | 2 |
| Tri(nonylphenyl) phosphite | 1.5 |
| Mercapto benzothiazylsulphenamide | 1.0 |
| Vulcup 40KE | 3.75 |
| Sulfur | 0.3 |

*Amount of SBR containing about 16.2% of processing oil needed to provide 25 parts SBR.

The compounded mixture of Example II is cured at about 160° C. Some of the properties of the cured composition are summarized in the following Table IV.

TABLE IV

| Properties of Cured Release Elastomer of Example II | |
| --- | --- |
| Monsanto Rheometer (160° C.) | |
| TS(2) (min) | 3.6 |
| TC(90) (min) | 34 |
| Min Torque | 10.5 |
| Max Torque | 39.9 |
| Dumbell Stress-Strain | |
| 100% Modulus (psi) | 492 |
| RT Tensile Strength (psi) | 813 |
| % Elongation | 157 |
| Ring Tear | |
| RT (ppi) | 92 |
| 100° C. (ppi) | 37 |
| Pico Abrasion | 0.85 |
| Mooney Viscosity ML/4 (100° C.) | 64 |
| Shore A Hardness (RT) | 65 |

The cured elastomeric compositions containing the block copolymers of the present invention are flexible and resilient, fracture resistant, and they exhibit desirable surface release characteristics. In particular, the cured elastomer compositions are capable of releasing or inhibiting the adhesion of naturally sticky or tacky materials such as uncured rubbers which come in contact with the cured elastomer. Accordingly, in another embodiment, this invention relates to various structures or manufactured articles in which it is desirable to have at least a portion of their outer surface exhibit surface release characteristics toward rubber or other materials with inherent stickiness. In accordance with the present invention, at least a portion of the outer surface of such structures comprises the cured elastomer compositions of the present invention. Particular examples of such structures include conveyor belts, and flexible diaphragms, bladders, bags, rolls, sleeves, etc., which are useful in tire assembly machines (TAMs). These flexible structures prepared in accordance with this invention release partially assembled tires and thus facilitate their efficient manufacture. More particularly, drum bladders and turn-up bladders useful in forming uncured tires may be prepared utilizing the cured elastomers of the present invention or preparing at least a portion of the outer surfaces of such bladders. In addition, the cured elastomer compositions of the present invention exhibiting desirable surface release characteristics can be utilized as the outer surface of fluid expandable bladders utilized as tire-curing bladders.

A particularly useful application of the elastomer compositions of the present invention is in the preparation of inflatable turn-up bladders (TUBs) to be used in machines for the assembly of tires (TAMs). TUBs are used in tire assembly machines to turn the ends of the plies wrapped on the tire building mandrel up around the bead rings and over them against the ply material. Since the rubber ply material is tacky by nature, the ply material tends to stick to those portions of the TUB which come in contact with the tacky ply ends, particularly since the inflated bladders exert pressure on the turned up ply ends. This adhesion tends to retard the retraction of the deflated bladders at the conclusion of the forming process, and the adhesion can also result in erosion of the bladder material coming in contact with the ply ends. Accordingly, this invention relates to the preparation of TUBs having at least a portion of the outer surface, namely, that portion of the surface which comes in contact with the tacky ply ends, which is non-adhesive or releasing to the tire plies with which they come in contact.

Since flexible diaphragms, bladders, bags, rolls and sleeves used in the tire manufacturing process are generally expanded and subjected to significant pressures, these devices, particularly the bladders, are prepared as multilayer structures generally having at least one reinforcing layer. Accordingly, one embodiment of the invention relates to multilayer elastomer structures wherein at least a portion of the outer layer of the elastomer structure has release characteristics and comprises a block copolymer of the present invention. Multilayer elastomer structures of the type contemplated by the present invention are illustrated in the accompanying drawings. FIG. 1 illustrates one embodiment of the invention wherein a multilayer elastomer structure 1 comprises at a top layer 2, an intermediate reinforcing layer 4 and a bottom layer 6. The top or outer layer 2 comprises an elastomer composition of the present invention exhibiting surface release characteristics. Reinforcing layer 4 may comprise reinforcing materials normally used for reinforcing elastomeric materials, and such reinforcing materials may include individual reinforcing cords or wires made from materials such as steel, glass fiber, polymeric materials such as polyesters, polyamides, polyimides, etc. Alternatively, the reinforcing material may be a textile fabric which may be a woven or non-woven fabric from natural or synthetic materials including glass fibers, steel wires, polymeric materials such as polyesters, polyamides, polyimides, etc. For example, the reinforcing layer may comprise cotton, rayon, nylon or cord reinforced polyester fabric. The reinforcing layer may also be made of a stretchable or elastic material such as spandex which allows the structure (e.g., bladder) to expand circumferentially.

The bottom or inner layer 6 of the structure illustrated in FIG. 1 may be comprised of any natural or synthetic elastomer or rubber having the properties required for use in the multilayer structure, and these are well known in the art of preparing and using bladders in the tire-building industry.

Figure 2:
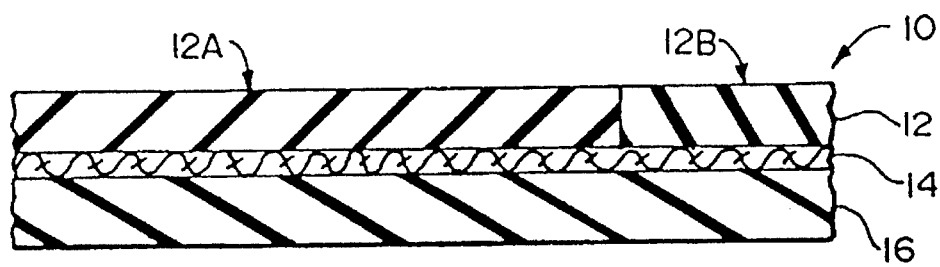
FIG. 2 is a schematic sectional view of another multilayer structure of this invention.

The multilayer structure illustrated in FIG. 2 is a variation of the structure illustrated in FIG. 1 wherein only a portion of the top or outer surface of the multilayer structure (12B) is prepared from the elastomer composition of the present invention. Such embodiment is useful, for example, when preparing TUBs since only that portion of the outer surface of the expandable bladder comes in contact with the tacky tire plies. Thus, in the embodiment illustrated in FIG. 2, the multilayer structure 10 is comprised of a top or outer layer 12, and intermediate or reinforcing layer 14 and a bottom or inner layer 16. Layers 14 and 16 of FIG. 2 correspond to layers 4 and 6 of FIG. 1 and the discussion regarding layers 4 and 6 of FIG. 1 is applicable equally to layers 14 and 16 of FIG. 2. As can be seen from FIG. 2, the top or outer layer 12 is prepared from two different materials illustrated as 12A and 12B. The material used to prepare that portion of the top layer identified as 12A may be any natural or synthetic rubber material normally used in the preparation of bladders. That portion of the top or outer layer 12 identified as 12B is prepared from the elastomer compositions of the present invention which exhibit the desired surface release characteristics.

Figure 3:
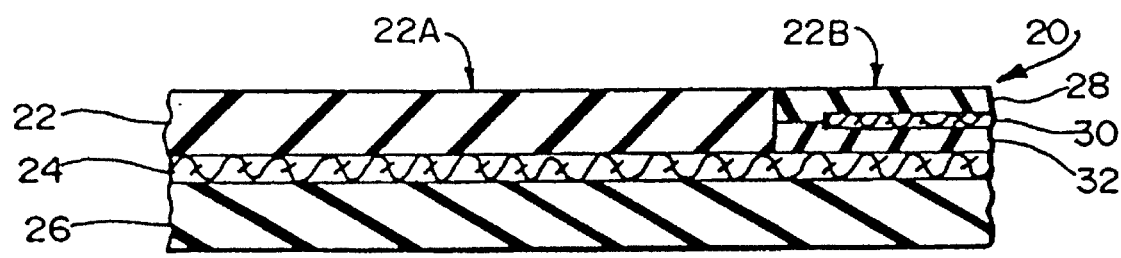
FIG. 3 is a sectional view of another embodiment of the multilayer structure of the present invention.

In another embodiment, the present invention relates to a new bladder construction which is a further variation of the construction illustrated in FIG. 2. The new bladder construction of this invention results in an improvement in the desirable properties of multilayers structures and in particular, an improvement in the performance and durability of the bladders when used as TUBs. The embodiment illustrated in FIG. 3 is a multilayered structure 20 which comprises three layers: a top or outer layer 22, an intermediate or reinforcing layer 24 and a bottom or inner layer 26. The discussion of layers 4 and 6 with respect to FIG. 1 is applicable to layers 24 and 26 of FIG. 3. FIG. 3 differs from FIG. 2 in that the portion of the upper or outer layer 12 of FIG. 2 identified as 12B is replaced in FIG. 3 by a laminate 22B. The remainder of the top or outer layer 22 identified as 22A in FIG. 3 is similar to that portion of the outer layer identified as 12A in FIG. 2. Laminate 22B of FIG. 3 comprises an outer or top layer of the cured elastomer of the present invention 28, an intermediate or reinforcing fabric layer 30 and an inner layer 32 of novel cured elastomer bonding composition (described further below) which is effective in bonding the layers of the laminate 22B and also is effective in bonding the laminate 22B to the intermediate or reinforcing layer 24 and to that portion of the top layer 22A contacted by laminate 22B. This elastomer bonding composition and layer 32 are sometimes referred to herein after as the "tiegum stock" and "tiegum layer" respectively. Any of the reinforcing materials discussed with respect to intermediate layer 4 in FIG. 1 can be utilized as the intermediate layer 30 in FIG. 3. In one preferred embodiment, however, the reinforcing layer 30 comprises a stretchable or elastic material such as a spandex fabric which has been dip-coated with a resorcinol-formaldehyde latex (RFL).

In one embodiment, the laminate 22B of FIG. 3 is prepared by positioning a sheet or fabric of reinforcing material 30 over a sheet of uncured bonding elastomer (tiegum) stock 32 as described more fully below, and a sheet of the uncured elastomer composition 38 of the present invention is placed on top of the reinforcing sheet. As-shown in FIG. 3, the reinforcing fabric 30 does not have to be as wide as the inner 32 and outer 28 layers. In such instances, there is direct contact of the outer layer 28 to the inner bonding layer 24. This tacky laminate can then be used as an outer edge portion of a TUB bladder construction.

The curable elastomer composition (tiegum stock) used as a bonding elastomer composition (layer 32 in laminate 22B) generally comprises rubbery polymers or polymer blends, a metal dimethacrylate selected from the group consisting of zinc dimethacrylate and magnesium dimethacrylate, and a curing system which comprises a mixture of a peroxide curing agent (crosslinker) and a sulfur curing agent. The rubber or rubbery polymers which may be employed in the tiegum stock of the present invention include any of the natural and synthetic rubbers described above. Examples of preferred rubbery polymers useful in the tiegum stock for preparing the laminate include natural rubber, ethylene/ propylene copolymers, ethylene/propylene/diene terpolymers, SBR, nitrile rubbers, neoprene and blends thereof. Natural rubber is a preferred rubber for the tiegum stock.

Metal dimetharylates employed in the tiegum compositions of the invention are selected from zinc dimethacrylate and magnesium dimethacrylate. The preferred metal dimethacrylate is zinc dimethacrylate. The zinc dimethacrylate and magnesium dimethacrylate may be prepared by any known method. In general, the zinc dimethacrylate may be prepared by reacting zinc oxide and methacrylic acid in an amount of from about 0.5 to about 0.6 mole of zinc oxide per mole of methacrylic acid in a liquid medium (e.g., water or a volatile organic liquid such as a liquid hydrocarbon), recovering the resulting zinc dimethacrylate product from the liquid medium and then drying the product. The magnesium dimethacrylate can be prepared in similar manner by reacting magnesium hydroxide and methacrylic acid in an amount of from about 0.5 to about 0.6 mole of magnesium hydroxide per mole of methacrylic acid in the liquid medium. If desired, the zinc dimethacrylate and magnesium dimethacrylate may be finely divided to aid in dispersing the materials into the rubber.

A preferred method for preparing the zinc dimethacrylate is described in U.S. Pat. No. 4,500,466 to Hayes et al, the disclosure of which in this regard is incorporated herein by reference. The method involves reacting with agitation zinc oxide and methacrylic acid in amounts of from about 0.5 to about 0.6 mole of zinc oxide per mole of methacrylic acid in a liquid aliphatic hydrocarbon (preferably an alkane, especially hexane), followed by recovery of the resultant zinc dimethacrylate from the liquid medium and drying thereof.

Alternatively, the zinc dimethacrylate or magnesium dimethacrylate utilized in the compositions of the invention may be formed insitu, although this method is less desirable. Thus, the zinc dimethacrylate may be formed in-situ by separately mixing the zinc oxide and methacrylic acid with the rubber, and the magnesium dimethacrylate may be formed in-situ by separately mixing the magnesium hydroxide and methacrylic acid with the rubber.

Amounts of metal dimethacrylate, i.e., zinc dimethacrylate, or magnesium dimethacrylate employed in the compositions of the invention may range from about 5 to about 50 parts by weight per 100 parts by weight of rubber with preferred amounts ranging from about 5 to about 25 parts by weight per 100 parts by weight of rubber.

The amounts of the curing system utilized in the tiegum stock will depend upon the type rubber employed and may broadly be stated as a cure effective amount. In general, such amount may range from about 1.0 to about 6.0 parts by weight per 100 parts by weight of rubber.

The curing system utilized in the tiegum stock comprises a mixture of sulfur or a sulfur-containing compound having available sulfur, a peroxide, crosslinking agent, and optionally, a co-curing agent. The curing systems comprising mixtures of the sulfur or sulfur compounds and peroxides described above with respect to the curing of the elastomer compositions containing the block copolymers of the present invention also are useful for curing the tiegum stock. A preferred peroxide curing system is bis-(t-butyl peroxy) diisopropyl benzene, and a preferred sulfur compound is sulfur. The amount of sulfur in the curing system may range from about 0.1 to about 1 part per 100 parts of rubber, and the amount of peroxide may range from about 2 to about 5 parts by weight per 100 parts by weight of rubber.

As indicated above, a co-curing agent may be included in the curable rubber compositions. In general, any co-curing agent which increases the utilization efficiency of the peroxide curing agent may be employed. Suitable co-curing agents which may be employed include N,N'-metaphenylenedimaleimide, triallyl isocyanurate and the like. Mixtures of such co-curing agent also be utilized. Amounts of co-curing agents employed in the compositions may range from about 0.1 to about 2.0 parts by weight per 100 parts by weight of rubber. Preferred amounts may range from about 0.5 to about 1.0 parts by weight per 100 parts by weight of rubber.

The curable rubber bonding compositions containing the rubber, metal dimethacrylate and the above curing systems may optionally contain other conventional additives which are commonly employed in rubber compositions Such additives may include small amounts of reinforcing fillers such as clays, carbon blacks, silicas, calcium carbonate and the like; process and extender oils; processing aids such as zinc stearate, sodium dodecyl sulfate and the like; viscosity reducing agents such as aliphatic hydrocarbon resins, antioxidants, waxes, plasticizers and the like. Any of these additives described above with respect to the release elastomer compositions can be used in the tiegum composition. Such additives may be utilized in amounts conventionally used in standard rubber compounds.

The curable rubber bonding compositions may be prepared by any conventional mixing procedure such as, for example, by mixing the ingredients in an internal mixer such as a Banbury mixer or Brabender Plasticorder or on a mill. The rubber compositions, depending on their intended use may be sheeted off on a rubber mill, calendered or extruded.

The following examples illustrate the vulcanizable elastomeric compositions useful as tiegum stock for preparing the laminates described above.

|  | Parts/Wt. |
|---|---|
| Natural rubber | 100 |
| N220 black | 25 |
| Zinc dimethacrylate | 15 |
| Zinc oxide | 8 |
| Stearic acid | 2 |
| Tri(nonylphenyl) phosphite | 1 |
| Processing oil | 3 |
| Mercapto benzothiazyl-sulfenamide | 1.5 |
| Vulcup 40 KE | 2.2 |
| Sulfur | 0.3 |

The properties of the product obtained when the above curable composition is cured by heating at a temperature of about 160° C. for about 30 to 60 minutes are summarized in the following Table V.

TABLE V

Properties of Cured Tiegum of Example III

| Monsanto Rheometer (160° C.) | |
|---|---|
| TS(2) (min) | 2.6 |
| TC (90) (min) | 27.1 |
| Min Torque | 3.3 |
| Max Torque | 44 |
| Dumbell Stress-Strain | |
| 100% Modulus (psi) | 523 |
| 300% Modulus (psi) | 1986 |
| RT Tensile Strength (psi) | 4189 |
| % Elongation | 555 |
| Ring Tear | |
| RT (ppi) | 644 |

TABLE V-continued

Properties of Cured Tiegum of Example III

| 100° C. (ppi) | 270 |
|---|---|
| Pico Abrasion | 3.95 |
| Mooney Viscosity ML/4 (100° C.) | 34 |
| Shore A Hardness (RT) | 65 |
| Rebound (%) | |
| at 23° C. | 74.6 |
| at 70° C. | 79.6 |

|  | Parts/Wt. |
|---|---|
| Natural rubber | 80 |
| SBR | 20 |
| N220 black | 10 |
| Zinc dimethacrylate | 15 |
| Zinc oxide | 8 |
| Stearic acid | 2 |
| Tri(nonylphenyl) phosphite | 1 |
| Processing oil | 3 |
| Silica | 25 |
| Mercapto benzothiazyl-sulfenamide | 1.5 |
| Vulcup 40 KE | 2.2 |
| Sulfur | 0.3 |

The configuration of the multilayer structure illustrated in FIG. 3 and described above is particularly useful in preparing inflatable rubber bladders conventionally used as TUBs. The bladder is constructed with the laminate 22B positioned at one of the outer edges of the bladder to reduce the tendency of the bladder to adhere to the unvulcanized rubber in the tire plies. A turn-up bladder in accordance with the present invention can be prepared as follows wherein the numerical references are to the corresponding numbered items of FIG. 3. A one-ply 0.047-inch gauge sheet 26 of uncured (unvulcanized) natural rubber (20 inches wide) is assembled on a forming drum. The two ends of the ply are overlapped slightly to form a seam. A bias cut polyester fabric 24 is applied over one side of the rubber ply, and a butt splice is made by pulling the cords from the overlap. A second sheet of polyester fabric is plied over the first sheet with opposite bias, and the butt splice is made by pulling the cords from the overlap. A second ply of 0.047-inch gauge natural rubber 22 having a width which is 5 inches less than the width of the first ply of rubber is applied over the fabric ply, and the ends of the natural rubber ply are butt spliced. At this point, the multilayer structure resembles the structure shown in FIG. 3 except that the laminate 22B has yet to be applied.

A 5-inch wide laminate is formed in situ by first applying a 5-inch wide ply 32 of the uncured elastomer composition (tiegum) of Example III over the exposed end of the reinforcing fabric 24. This ply 32 is 0.027-inch gauge. A 3-inch wide strip of reinforcing fabric 30 composed of black spandex coated on one side with a resorcinol-formaldehyde latex (Burlington spandex style S56022) is then placed along the outer edge of the 5-inch wide ply 32 of uncured tiegum stock. A 5-inch wide ply (0.020-inch gauge) of the curable block copolymer elastomer of this invention is then applied as a top layer 28 over the spandex reinforcing fabric 30 and tiegum layer 32 to form the desired laminate 22B. The uncured turn-up bladder constructed in this manner is removed from the drum, wrapped with one ply nylon strap, and cured by heating at a temperature of about 160° C. for a period of about 30 to 60 minutes. The bladder prepared in this manner can then be used as a turn-up bladder in a tire-building machine. These bladders are more durable because of the excellent release characteristics exhibited by the elastomer of the invention which forms the surface coating of the 5-inch strip along the one edge of the bladder which comes into contact with the tacky uncured tire plies during the tire forming procedure.

While the invention has been explained in relation to its preferred embodiments, it is to be understood that various modifications thereof will become apparent to those skilled in the art upon reading the specification. Therefore, it is to be understood that the invention disclosed herein is intended to cover such modifications are embraced within the scope of the appended claims.

We claim:

1. A curable composition comprising:
   (1) a natural or synthetic rubber; and
   (2) from about 66% to about 900% by weight, based on the weight of (1), of a block copolymer having a number average molecular weight of at least about 100,000 and comprising alternating blocks of
      (A) a polysiloxane; and
      (B) a copolymer of a 1,3-conjugated diene and a monovinyl aromatic compound.

2. The curable composition of claim 1 wherein the block copolymer comprises from about 10% to about 75% by weight of polysiloxane blocks.

3. The curable composition of claim 2 wherein the polysiloxane block (A) is an elastomeric linear polysiloxane characterized by the formula $$-[Si(R)_2O]_x- \qquad (I)$$

in which each R is independently a hydrocarbyl group containing 1 to about 18 carbon atoms, and x is from about 100 to about 6000.

4. The curable composition of claim 1 wherein the conjugated diene is 1,3-butadiene, isoprene or piperylene, and the vinyl aromatic compound is a styrene.

5. The curable composition of claim 1 wherein the copolymer (B) is a copolymer of 1,3-butadiene and a styrene.

6. The curable composition of claim 1 wherein the block copolymer prepared by (a) reacting a polysiloxane fluid with a dilithiated copolymer of a conjugated diene and a monovinyl aromatic compound obtained by polymerization of the conjugated diene and monovinyl aromatic compound in the presence of an organolithium compound to form a block copolymer intermediate, and (b) thereafter neutralizing the intermediate with a protonic acid.

7. The curable composition of claim 6 wherein the polysiloxane is a linear polysiloxane characterized by the formula $$-[Si(R)_2O]_a- \qquad (II)$$

in which each R is independently a hydrocarbyl group containing 1 to about 18 carbon atoms, and a is from about 1400 to about 10,000.

8. The curable composition of claim 6 wherein the polysiloxane is polydimethylsiloxane.

9. The curable composition of claim 6 wherein the conjugated diene is 1,3-butadiene, isoprene or piperylene, and the monovinyl aromatic compound is a styrene.

10. The curable composition of claim 6 wherein the dilithiated copolymer is a dilithiated copolymer of 1,3-butadiene and styrene.

11. The curable composition of claim 7 wherein each R group is independently a methyl, ethyl or phenyl group.

12. The curable composition of claim 1 wherein copolymer (B) is prepared from a mixture comprising about 50% to about 90% of 1,3-butadiene and from about 10% to about 50% of a styrene compound.

13. The curable composition of claim 1 also containing
   (C) a curing system comprising an organic peroxide crosslinking agent and a sulfur-containing compound having available sulfur.

14. The curable composition of claim 13 also containing
   (D) at least one reinforcing filler.

15. The curable composition of claim 14 wherein the filler comprises carbon black, silica or a mixture of carbon black and silica.

* * * * *